United States Patent
Kim

(10) Patent No.: US 11,146,741 B2
(45) Date of Patent: Oct. 12, 2021

(54) ELECTRONIC DEVICE AND METHOD FOR CAPTURING AND DISPLAYING IMAGE

(71) Applicant: Samsung Electronics Co., Ltd., Suwon-si (KR)

(72) Inventor: Seung-woo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 16/473,153

(22) PCT Filed: Jan. 18, 2018

(86) PCT No.: PCT/KR2018/000827
§ 371 (c)(1),
(2) Date: Jun. 24, 2019

(87) PCT Pub. No.: WO2018/143584
PCT Pub. Date: Aug. 9, 2018

(65) Prior Publication Data
US 2020/0092496 A1 Mar. 19, 2020

(30) Foreign Application Priority Data

Feb. 1, 2017 (KR) .......................... 10-2017-0014375

(51) Int. Cl.
*H04N 5/262* (2006.01)
*H04N 5/232* (2006.01)

(52) U.S. Cl.
CPC ....... *H04N 5/2624* (2013.01); *H04N 5/23203* (2013.01)

(58) Field of Classification Search
CPC .......................... H04N 5/2624; H04N 5/23203
See application file for complete search history.

(56) References Cited

U.S. PATENT DOCUMENTS

| 2013/0162842 A1* | 6/2013 | Greyson | ............ H04N 5/23232 348/207.1 |
| 2013/0278781 A1 | 10/2013 | Chung et al. | |
| 2016/0205302 A1 | 7/2016 | Desai et al. | |

FOREIGN PATENT DOCUMENTS

| JP | 4009897 A | 11/2007 |
| JP | 2014-121064 A | 6/2014 |

(Continued)

OTHER PUBLICATIONS

International Search Report dated Apr. 26, 2018, issued in International Application No. PCT/KR2018/000827.

*Primary Examiner* — Twyler L Haskins
*Assistant Examiner* — Fayez A Bhuiyan
(74) *Attorney, Agent, or Firm* — Jefferson IP Law, LLP

(57) ABSTRACT

An electronic device for displaying an image includes: a display; a communicator configured to transmit, to an image-capturing device connected to the electronic device, synchronization information for synchronization and receive, from the image-capturing device, a first image, image-capturing time information of the first image generated based on the synchronization information, and position information on which the first image was captured; a memory configured to store one or more instructions; and a processor configured to execute the one or more instructions stored in the memory, wherein the processor is further configured to control, by executing the one or more instructions, one or more images to be obtained, a second image corresponding to the first image to be determined from among the one or more images based on the image-capturing time information of the first image and the position information on which the first image was captured, and a third image obtained by synthesizing the first image and the second image to be displayed on the display.

17 Claims, 8 Drawing Sheets

(56) References Cited

FOREIGN PATENT DOCUMENTS

| JP | 2016-178435 A | 10/2016 |
|----|---------------|---------|
| KR | 10-2013-0117991 A | 10/2013 |
| KR | 10-2015-0097267 A | 8/2015 |

\* cited by examiner

FIG. 6

| 601 IMAGE-CAPTURING DEVICE IDENTIFICATION VALUE | 602 IMAGE-CAPTURING POSITION INFORMATION | 603 IMAGE-CAPTURING DIRECTION INFORMATION | 604 RELATIVE POSITION INFORMATION | 605 IMAGE-CAPTURING TIME INFORMATION |
|---|---|---|---|---|
| #1 | 34 06.56N/117 49.59W/1192ft | N30° | 0,0 | 1.0 |
| #2 | 34 06.56N/117 49.60W/1192ft | N40° | 2,0 | 1.0 |
| ... | | | | |

600

610
620

ELECTRONIC DEVICE AND METHOD FOR CAPTURING AND DISPLAYING IMAGE

TECHNICAL FIELD

The present disclosure relates to an electronic device and a method of capturing and displaying an image, and more particularly, to an electronic device and a method of displaying an image synthesized by using synchronization information.

BACKGROUND ART

As multimedia technology and computer technology have been developed, users may receive various services using electronic devices. In particular, as image capturing and processing technology has been developed, users may receive images obtained by synthesizing a plurality of images by using electronic devices.

However, in order to provide users with images having various and wider fields of view, there is a demand for technology for efficiently using a plurality of electronic devices having image-capturing functions and communication functions.

DESCRIPTION OF EMBODIMENTS

Technical Problem

Provided are an electronic device and a method of synthesizing and displaying an image captured by at least one device by using synchronization information.

Solution to Problem

According to an aspect of the present disclosure, an electronic device for displaying an image includes: a display; a communicator configured to transmit, to an image-capturing device connected to the electronic device, synchronization information for synchronization and receive, from the image-capturing device, a first image, image-capturing time information of the first image generated based on the synchronization information, and position information on which the first image was captured; a memory storing one or more instructions; and a processor configured to execute the one or more instructions stored in the memory, wherein the processor is further configured to control, by executing the one or more instructions, one or more images to be obtained, a second image corresponding to the first image to be determined from among the one or more images based on the image-capturing time information of the first image and the position information on which the first image was captured, and a third image obtained by synthesizing the first image and the second image to be displayed on the display.

According to another embodiment of the disclosure, a method, performed by an electronic device, of displaying an image includes: transmitting, to an image-capturing device connected to the electronic device, synchronization information for synchronization; receiving a first image, image-capturing time information of the first image generated based the synchronization information, and position information on which the first image was captured from the image-capturing device; obtaining one or more images; determining a second image corresponding to the first image from among the one or more images, based on the image-capturing time information of the first image and the position information on which the first image was captured; and displaying a third image obtained by synthesizing the first image and the second image.

BRIEF DESCRIPTION OF DRAWINGS

FIG. 6 is a diagram illustrating metadata according to an embodiment.

MODE OF DISCLOSURE

Figure 1:
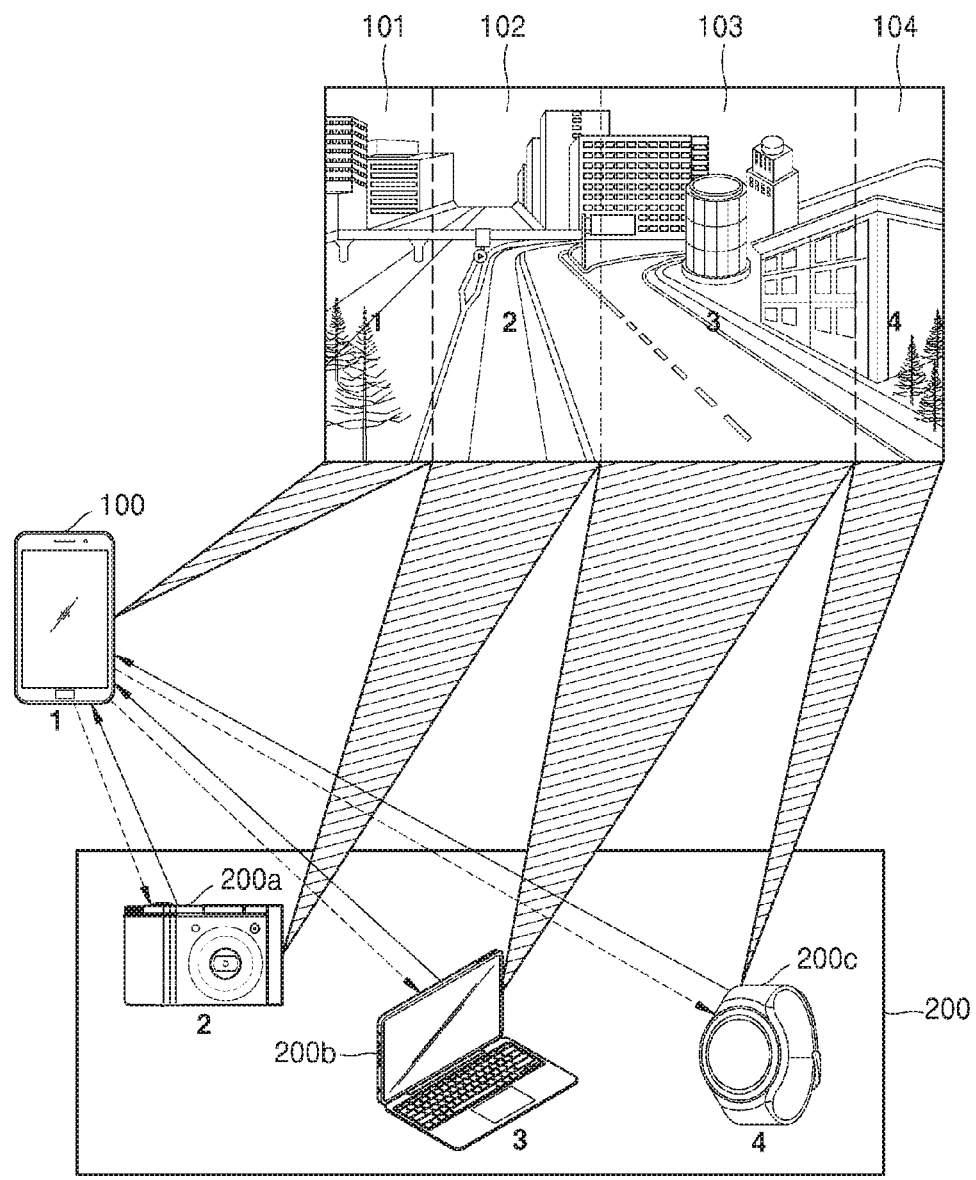
FIG. 1 is a view illustrating a system including an electronic device and a plurality of image-capturing devices, according to an embodiment.

The disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

The disclosure will now be described more fully with reference to the accompanying drawings.

FIG. 1 is a view illustrating a system including an electronic device and a plurality of image-capturing devices, according to an embodiment.

Referring to FIG. 1, the system according to an embodiment of the disclosure may include an electronic device 100 and at least one image-capturing device 200 connected to the electronic device 100. For example, the at least one image-capturing device 200 may be connected to the electronic device 100 through a network.

According to an embodiment of the disclosure, the at least one image-capturing device 200 may include a camera (a first image-capturing device) 200a, a notebook (a second image-capturing device) 200b, or a wearable electronic device (a third image-capturing device) 200c such as a smart watch. However, the disclosure is not limited thereto, and the at least one image-capturing device 200 may include any of electronic devices having an image-capturing function and a communication function.

In order to obtain an image including a first area 101, a second area 102, a third area 103, and a fourth area 104 which are adjacent to one another, the electronic device 100 may have to separately capture an image of each area. When the electronic device 100 obtains images of areas captured at different times, the electronic device 100 may fail to display an image including all areas at the same time.

Accordingly, in order to obtain an image of all areas including the first through fourth areas 101, 102, 103, and 104, the electronic device 100 according to an embodiment of the disclosure may obtain images of areas captured at the same time by the at least one image-capturing device 200, which is separate from the electronic device 100, and may synthesize the obtained images.

According to an embodiment of the disclosure, the electronic device 100 may receive an image captured by the at least one image-capturing device 200 from the at least one image-capturing device 200 and may display an image obtained by synthesizing the received image and at least one image corresponding to the received image. In this case, the electronic device 100 may display an image including all areas at the same time.

For example, the electronic device 100 may transmit synchronization information to the at least one image-capturing device 200. When the at least one image-capturing device 200 captures an image, the at least one image-capturing device 200 may generate image-capturing time information based on the synchronization information received from the electronic device 100. Also, the electronic device 100 may obtain one or more images. The one or more images may include an image captured by the electronic device 100 or an image received from the at least one image-capturing device 200.

When the electronic device 100 receives an image from the at least one image-capturing device 200, the electronic device 100 may also receive image-capturing time information of the image and position information of the image, and the image-capturing time information may be information about a time when the image generated based on the synchronization information is captured. The electronic device 100 may synthesize the one or more images obtained by the electronic device 100 based on the image-capturing time information and the position information of the image.

Referring to FIG. 1, the electronic device 100 may obtain a first image by photographing the first area 101. The electronic device 100 may transmit synchronization information to the first image-capturing device 200*a*, the second image-capturing device 200*b*, and the third image-capturing device 200*c*. Also, the electronic device 100 may receive a second image of the second area 102 and image-capturing time information of the second image from the first image-capturing device 200*a*, may receive a third image of the third area 103 and image-capturing time information of the third image from the second image-capturing device 200*b*, and may receive a fourth image of the fourth area 104 and image-capturing time information of the fourth image from the third image-capturing device 200*c*.

According to an embodiment of the disclosure, the electronic device 100 may determine at least one image corresponding to the second image based on the image-capturing time information of the second image. For example, the electronic device 100 may determine the first image, the third image, and the fourth image captured at the same time as that of the second image as images corresponding to the second image, based on the image-capturing time information of the second image.

According to an embodiment of the disclosure, the electronic device 100 may display a synthesized image so that the first through fourth images are located at the same positions as spatial positions of the first through fourth areas 101 through 104.

Examples of the electronic device 100 may include, but are not limited to, a smartphone, a tablet personal computer (PC), a PC, a smart television (TV), a mobile phone, a personal digital assistant (PDA), a laptop, a media player, a micro-server, a global positioning system (GPS) device, an electronic book terminal, a digital broadcast terminal, a navigation system, a kiosk, an MP3 player, a digital camera, a home appliance, and any of other mobile or non-mobile computing devices. Also, examples of the electronic device 100 may include a wearable device such as a watch, glasses, a hair band, or a ring having a display function and a data processing function. However, the disclosure is not limited thereto, and the electronic device 100 may be any type of device having a communication function and an image display function.

According to an embodiment of the disclosure, examples of the network through which the electronic device 100 and the at least one image-capturing device 200 are connected may include a wired network such as a local area network (LAN) and any type of wireless network such as a mobile radio communication network, Wi-Fi, or a satellite communication network. Examples of the network may include Bluetooth low energy (BLE), Zigbee, Wi-Fi Direct (WFD), ultra-wideband (UWB), infrared data association (IrDA), and near-field communication (NFC). Also, the network may include an Internet-of-Things (IoT).

For example, the electronic device 100 and the first through third image-capturing devices 200*a*, 200*b*, and 200*c* may be configured to perform synchronization and image sharing in a distributed manner in an IoT environment.

According to an embodiment of the disclosure, because the electronic device 100 shares captured images with other apparatuses by using synchronization information, the electronic device 100 may provide a synthesized image in real time without employing a separate image-collecting server. Because the electronic device 100 shares captured images with other apparatuses through short-range wireless communication, the electronic device 100 may improve a data communication environment.

Although the electronic device 100 is a control apparatus for controlling synchronization and image sharing with the at least one image-capturing device 200 in the system in FIG. 1, one of the first through third image-capturing devices 200*a*, 200*b*, and 200*c* may perform a function of the electronic device 100 of FIG. 1.

Figure 2:
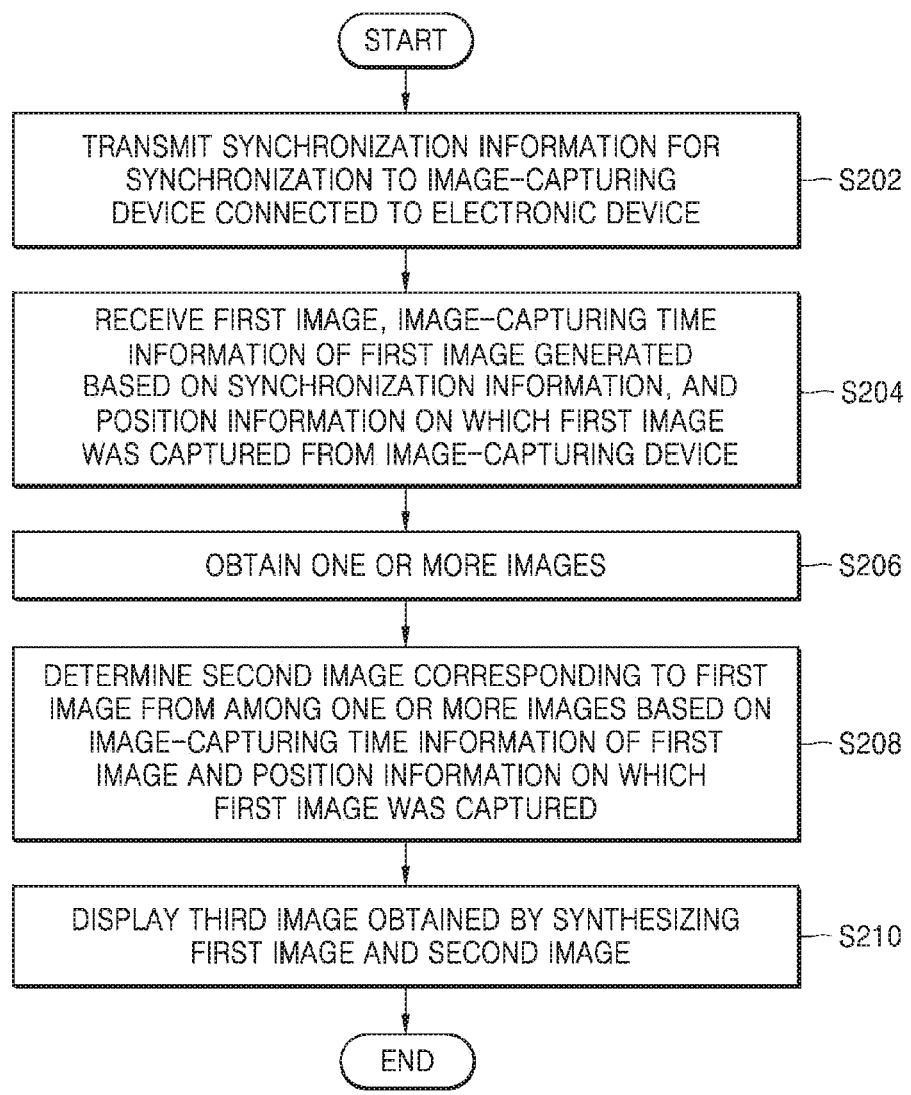
FIG. 2 is a flowchart of a method, performed by the electronic device, of displaying an image, according to an embodiment.

FIG. 2 is a flowchart of a method, performed by an electronic device, of displaying an image, according to an embodiment of the disclosure.

Referring to FIG. 2, in operation S202, the electronic device 100 may transmit synchronization information for synchronization to the image-capturing device 200 connected to the electronic device 100. The term 'synchronization' may refer to an adjustment of times when a plurality of operations are performed by a plurality of apparatuses. Also, the synchronization information may be used to receive an image from the image-capturing device 200 or generate information needed to process the received image.

For example, the synchronization information may include a reference time and control information for controlling an image-capturing time of the image-capturing device 200 generated based on the reference time. In detail, the reference time may be a relative time value with a time when the electronic device 100 transmits the synchronization information to the image-capturing device 200 as '0'. Alternatively, the electronic device 100 may use a coordinated universal time (UTC) or Greenwich mean time (GMT)-based standard time as the reference time.

According to an embodiment of the disclosure, the electronic device 100 may perform pairing to be connected to the image-capturing device 200. For example, the electronic device 100 may transmit a pairing request to the image-capturing device 200. Also, the electronic device 100 may receive a response to the pairing request from the image-capturing device 200.

For example, the electronic device 100 may search for the image-capturing device 200 by using a communication signal. The electronic device 100 may search for the image-capturing device 200 existing in an area where communication is possible. When the image-capturing device 200 is included in a pre-registered image-capturing device list, the electronic device 100 may transmit a pairing request signal to the image-capturing device 200.

Alternatively, when the image-capturing device 200 is not included in the pre-registered image-capturing device list, the electronic device 100 may transmit an authentication request to the image-capturing device 200. Also, the electronic device 100 may register the image-capturing device 200 by receiving authentication information related to the authentication request from the image-capturing device 200 and may perform pairing with the image-capturing device 200.

In operation S204, the electronic device 100 may receive a first image, and image-capturing time information of the first image and position information of the first image generated based on the synchronization information. The first image may be an image captured by the image-capturing device 200.

For example, the electronic device 100 may receive the image-capturing time information of the first image generated based on the reference time included in the synchronization information from the image-capturing device 200. In detail, when the first image is captured by the image-capturing device 200 after 3.0 seconds elapse from the reference time, the electronic device 100 may receive '3.0 seconds' as the image-capturing time information of the first image.

Also, the electronic device 100 may receive GPS-based position information of the first image from the image-capturing device 200. Alternatively, the electronic device 100 may receive relative position information based on a current position of the electronic device 100 as the position information of the first image from the image-capturing device 200.

In operation S206, the electronic device 100 may obtain one or more images. For example, the electronic device 100 may receive at least one image from an image-capturing device other than the image-capturing device 200 that transmits the first image from among image-capturing devices (e.g., the first through third image-capturing devices 200*a*, 200*b*, and 200*c* of FIG. 1) connected to the electronic device 100. Alternatively, the electronic device 100 may obtain one or more images by using at least one camera module included in the electronic device 100.

For example, the electronic device 100 may include a plurality of camera modules. In detail, the electronic device 100 may include at least one camera module on each of a front surface and a rear surface of the electronic device 100. Also, the electronic device 100 may obtain one or more images by sequentially or simultaneously capturing images by using the plurality of camera modules.

In operation S208, the electronic device 100 may determine a second image corresponding to the first image from among the one or more images based on the image-capturing time information and the position information. The second image corresponding to the first image may be an image captured by another apparatus around the image-capturing device 200 in order to form one image with the first image. For example, the electronic device 100 may determine the second image corresponding to the first image in order to form one panoramic image.

In an embodiment of the disclosure, the electronic device 100 may determine the second image by comparing image-capturing time information and position information of each obtained image with the image-capturing time information and the position information on which the first image was captured. For example, the electronic device 100 may determine an image captured at the same time as the image-capturing time information of the first image from among the one or more images as the second image. Alternatively, the electronic device 100 may determine an image captured at a time within a predetermined range (e.g., ±4.0 seconds) from the image-capturing time information of the first image from among the one or more images as the second image.

For example, the electronic device 100 may determine an image captured within a predetermined range from the position information on which the first image was captured from among the one or more images as the second image corresponding to the first image. For example, the electronic device 100 may determine an image captured within a range where short-range wireless communication with the electronic device 100 or the image-capturing device 200 is possible as the second image.

For example, the predetermined range related to the image-capturing time or the position may be a value set by a user input or a default value pre-stored in the electronic device 100. Alternatively, the predetermined range related to the image-capturing time or the position may be a value determined according to an application stored in the electronic device 100.

In operation S210, the electronic device 100 may display a third image obtained by synthesizing the first image and the second image. For example, the electronic device 100 may display the third image by combining the first image and the second image.

According to an embodiment of the disclosure, the electronic device 100 may determine portions of the third image where the first image and the second image are displayed, and may display the third image in which the first image and the second image are located in the determined portions. The portions of the third image where the first image and the second image are displayed may be determined in various ways. For example, the electronic device 100 may display the third image in which the second image overlaps a specific portion of the first image in a circular or polygonal shape. Also, the electronic device 100 may determine portions divided from the third image according to the total number of the first and second images. Alternatively, when there are a plurality of the second images, the electronic device 100 may display the third image in which the first image is located between any two of the second images.

According to an embodiment of the disclosure, the electronic device 100 may determine a portion of the third image corresponding to the first image based on the position information on which the first image was captured and direction information on which the first image was captured.

Also, the electronic device 100 may synthesize the first image with the second image based on the determined portion. For example, the electronic device 100 may receive the direction information on which the first image was captured along with the position information on which the first image was captured from the image-capturing device 200.

For example, the electronic device 100 may determine that a scene included in the first image is located at the right of a scene included in the second image based on the position information and the direction information on which the first image was captured. The electronic device 100 may determine that a position of the first image is located at the right of a position of the second image. In this case, the electronic device 100 may determine that, in the third image, the first image is to be displayed at the right of the second image.

Alternatively, when the electronic device 100 divides the third image into two parts, at least a portion of the second image may be displayed in the left part and at least a portion of the first image may be displayed in the right part.

According to an embodiment of the disclosure, the third image may be a three-dimensional (3D) image. For example, the electronic device 100 may synthesize the first image and the second image into a 3D image based on the position information and the direction information on which the first image was captured received from the image-capturing device 200.

Figure 3:
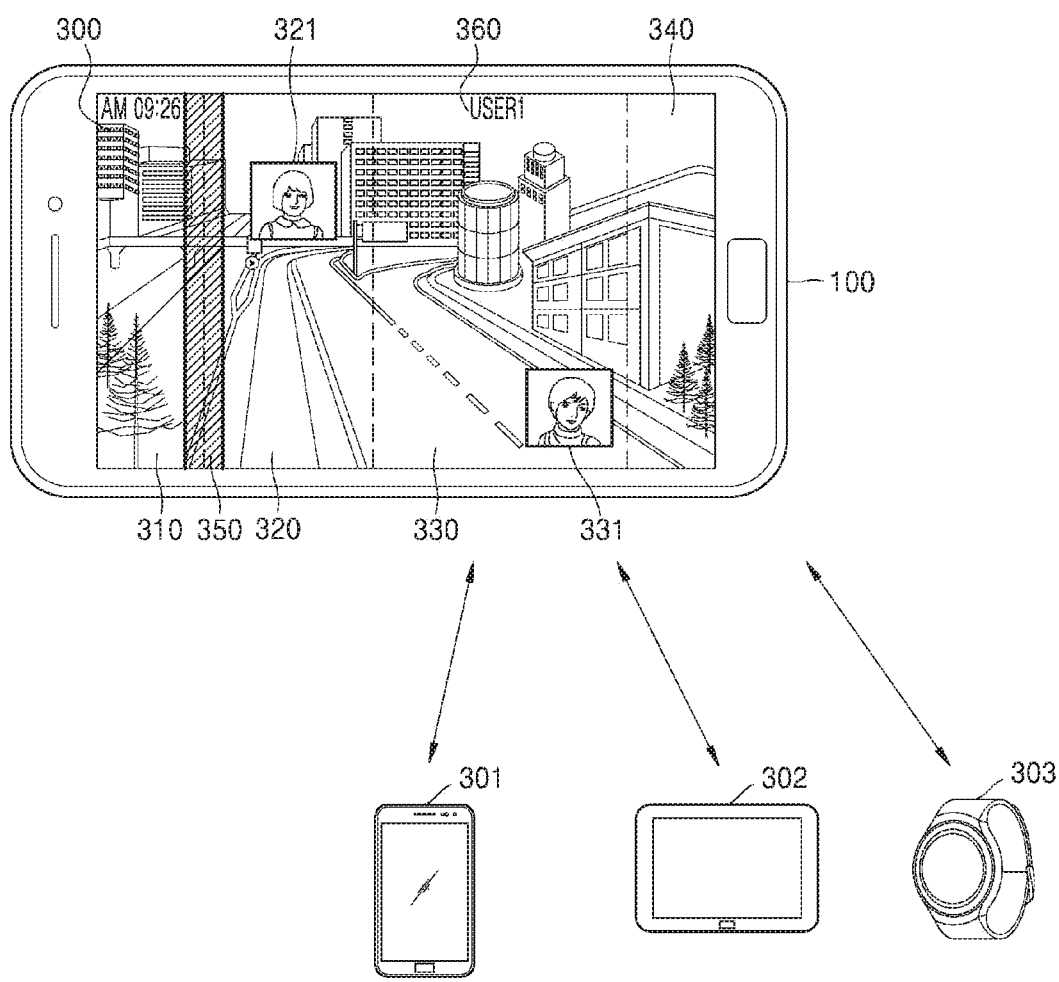
FIG. 3 is a view illustrating an example where an image synthesized by the electronic device is displayed, according to an embodiment.

FIG. 3 is a view illustrating an example where an image synthesized by an electronic device is displayed, according to an embodiment of the disclosure.

Referring to FIG. 3, the electronic device 100 may display a first image 300 obtained by synthesizing a plurality of images. For example, the first image 300 may include a second image 310 captured by the electronic device (that is a first image-capturing device) 100, a third image 320 and a fourth image 321 captured by a second image-capturing device 301, a fifth image 330 and a sixth image 331 captured by a third image-capturing device 302, and at least a part of a seventh image 340 captured by a fourth image-capturing device 303.

According to an embodiment of the disclosure, the electronic device 100 may display the first image 300 obtained by synthesizing the plurality of images, based on relative position information of the image-capturing device 200 that is determined based on a position of the electronic device 100. The relative position information of the image-capturing device 200 may be represented as coordinates 'x,y' with the position of the electronic device 100 that becomes a criterion as '0,0'.

For example, sequentially, the second image-capturing device 301 may be located at the right of the electronic device 100, the third image-capturing device 302 may be located at the right of the second image-capturing device 301, and the fourth image-capturing device 303 may be located at the right of the third image-capturing device 302. In this case, it may be determined that the position of the electronic device 100 is '0,0', relative position information of the second image-capturing device 301 is '1,0', relative position information of the third image-capturing device 302 is '2,0', and relative position information of the fourth image-capturing device 303 is '3,0'.

Also, the electronic device 100 may display the first image 300 in which the second image 310, the third image 320, the fifth image 330, and the seventh image 340 are arranged according to coordinates based on the relative position information of the first through fourth image-capturing devices.

According to an embodiment of the disclosure, when adjacent images in the first image 300 partially overlap each other, the electronic device 100 may display the first image 300 having an overlapping portion.

For example, the electronic device 100 may determine an overlapping portion between at least two images by analyzing pixels of at least two adjacent images. The electronic device 100 may display the first image 300 obtained by synthesizing an overlapping portion 350 between the second image 310 and the third image 320. For example, the electronic device 100 may display the first image 300 by selecting one image from among at least two adjacent images and cutting away an overlapping portion of an image other than the selected image, or by adjusting a transparence of the overlapping portion.

According to an embodiment of the disclosure, the electronic device 100 may display the fourth image 321 in a portion of the first image 300 where the third image 320 is displayed. For example, the third image 320 may be an image captured by a camera located on a rear surface of the second image-capturing device 301, and the fourth image 321 may be an image captured by a camera located on a front surface of the second image-capturing device 301.

Likewise, the electronic device 100 may display the sixth image 331 in a portion of the first image 300 where the fifth image 330 is displayed.

According to an embodiment of the disclosure, the electronic device 100 may display the first image 300 including text information ('USER1') 360. For example, the text information 360 may be text information corresponding to the image-capturing device 200. Also, the electronic device 100 may also display the text information 360 corresponding to the third image-capturing device 302 in the portion of the first image 300 where the fifth image 330 is displayed.

For example, the electronic device 100 may receive the text information 360 corresponding to the third image-capturing device 302 from the third image-capturing device 302. Alternatively, the electronic device 100 may receive the text information 360 as information included in metadata about a corresponding image. The text information 360 corresponding to the third image-capturing device 302 may be text information input by a user or pre-stored device-related information. In detail, the text information 360 corresponding to the third image-capturing device 302 may include a phone number, a user name, or a device name.

Figure 4:
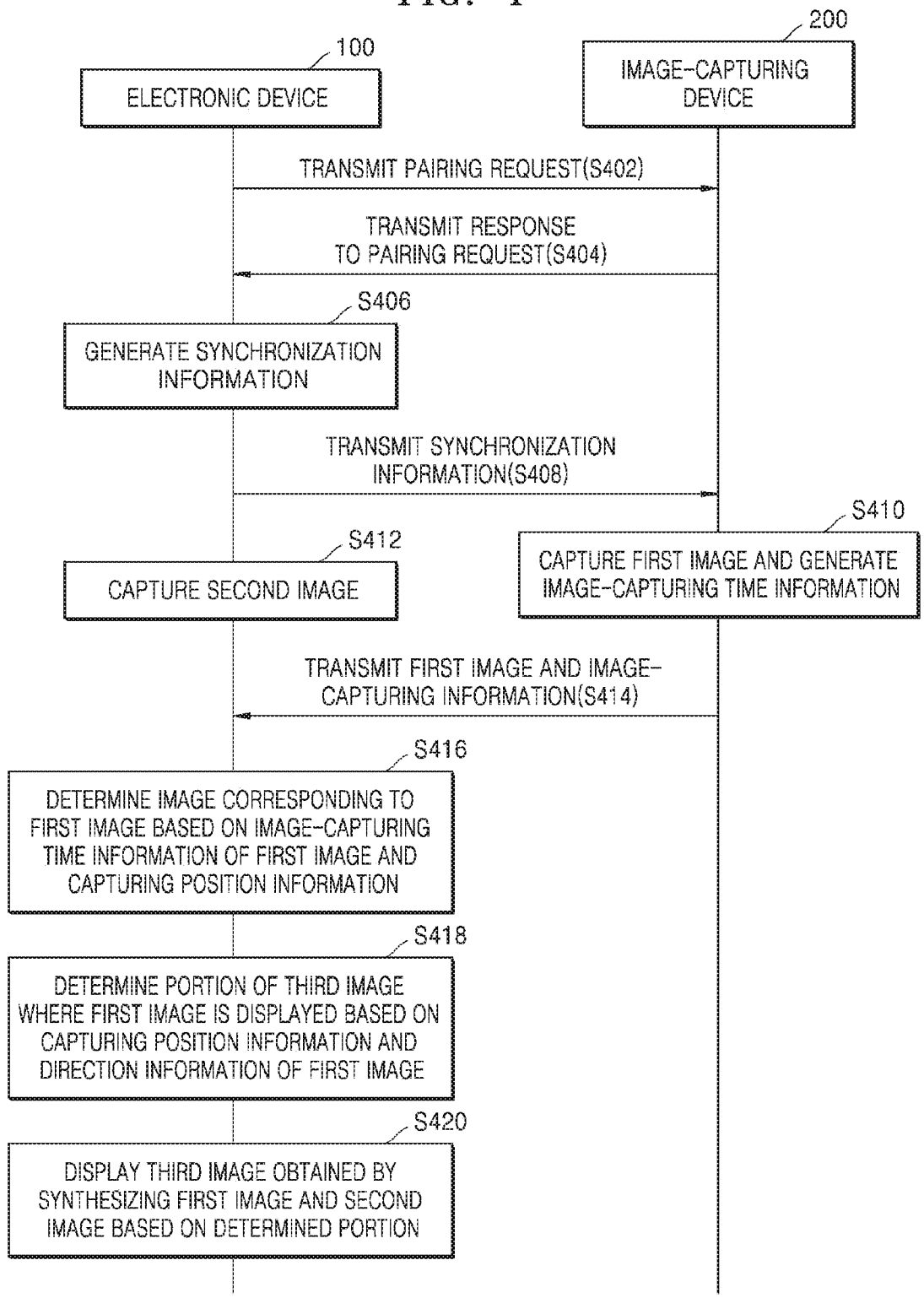
FIG. 4 is a view for describing a method, performed by the electronic device, of displaying an image obtained by receiving and synthesizing an image captured by an image-capturing device, according to an embodiment.

FIG. 4 is a view for describing a method, performed by an electronic device, of displaying an image obtained by receiving and synthesizing an image captured by an image-capturing device, according to an embodiment of the disclosure.

Referring to FIG. 4, in operation S402, the electronic device 100 may transmit a pairing request to the image-capturing device 200. In operation S404, the image-capturing device 200 may transmit a response to the pairing request to the electronic device 100. For example, the image-capturing device 200 may transmit the response to the pairing request including device information of the image-capturing device 200 to the electronic device 100. For example, the device information of the image-capturing device 200 may include a position of the image-capturing device 200 and a resolution of an image captured by the image-capturing device 200.

In operation S406, the electronic device 100 may generate synchronization information. For example, the synchronization information may include a reference time and control information for controlling an image-capturing start time of the image-capturing device 200 generated based on the reference time.

According to an embodiment of the disclosure, the electronic device 100 may generate the synchronization information based on the response received in operation S404. For example, the electronic device 100 may generate the control information for controlling the image-capturing start time of the image-capturing device 200 based on the device information of the image-capturing device 200. In detail, the electronic device 100 may generate the control information with the image-capturing start time of the image-capturing device 200 as a time after 3.0 seconds elapse from the reference time, based on the position of the image-capturing device 200.

In operation S408, the electronic device 100 may transmit the generated synchronization information. According to an embodiment of the disclosure, the electronic device 100 may determine whether to transmit the synchronization information based on the device information of the image-capturing device 200.

For example, when the position of the image-capturing device 200 is not within a preset range, the electronic device 100 may not transmit the synchronization information. Alternatively, when a difference between the resolution of the image captured by the image-capturing device 200 and a resolution of an image captured by the electronic device 100 exceeds a preset range, the electronic device 100 may not transmit the synchronization information. The electronic device 100 may efficiently obtain and synthesize necessary images by transmitting the synchronization information in consideration of the device information of the image-capturing device 200.

In operation S410, the image-capturing device 200 may capture a first image. For example, the image-capturing device 200 may capture the first image based on the synchronization information received from the electronic device 100 in operation S408. For example, the image-capturing device 200 may capture the first image according to the reference time and the control information for controlling an image-capturing time of the first image included in the synchronization information. The control information for controlling the image-capturing time of the first image may include a time value generated based on the reference time.

Also, in operation S410, the image-capturing device 200 may generate and store image-capturing time information of the first image based on the synchronization information received from the electronic device 100 in operation S408. For example, when the first image is captured after 3.0 seconds elapse from the reference time included in the synchronization information, the image-capturing device 200 may generate the image-capturing time information of the first image as '3.0'. Also, the image-capturing device 200 may store the image-capturing time information of the first image as metadata about the first image.

In operation S412, the electronic device 100 may capture a second image. For example, the electronic device 100 may capture the second image at the same time as transmitting the synchronization information in operation S408. Alternatively, the electronic device 100 may capture the second image based on the control information for controlling the image-capturing start time of the image-capturing device 200 generated in operation S406. For example, the electronic device 100 may capture the second image at the same time as the image-capturing start time of the image-capturing device 200, or may capture the second image at a time 2.0 seconds earlier than the image-capturing start time.

In operation S414, the image-capturing device 200 may transmit the first image and image-capturing information of the first image. The image-capturing information of the first image may include time information, position information, and direction information on which the first image was captured, and an identification value of the image-capturing device 200 that captures the first image. For example, the identification value of the image-capturing device 200 may be a value assigned by the electronic device 100 to identify the image-capturing device 200 from among a plurality of apparatuses connected to the electronic device 100. The electronic device 100 may receive the identification value from the electronic device 100, and may transmit the identification value along with the first image to the electronic device 100.

In operation S416, the electronic device 100 may determine an image corresponding to the first image based on the image-capturing time information of the first image and the position information on which the first image was captured. For example, the electronic device 100 may determine the second image as the image corresponding to the first image, based on the image-capturing time information of the first image and the position information on which the first image was captured. Embodiments described with reference to operation S208 of FIG. 2 may be applied to operation S416.

In operation S418, the electronic device 100 may determine a portion of a third image where the first image is displayed, based on the position information and the direction information on which the first image was captured. In operation S420, the electronic device 100 may display the third image obtained by synthesizing the first image and the second image based on the determined portion.

Figure 5:
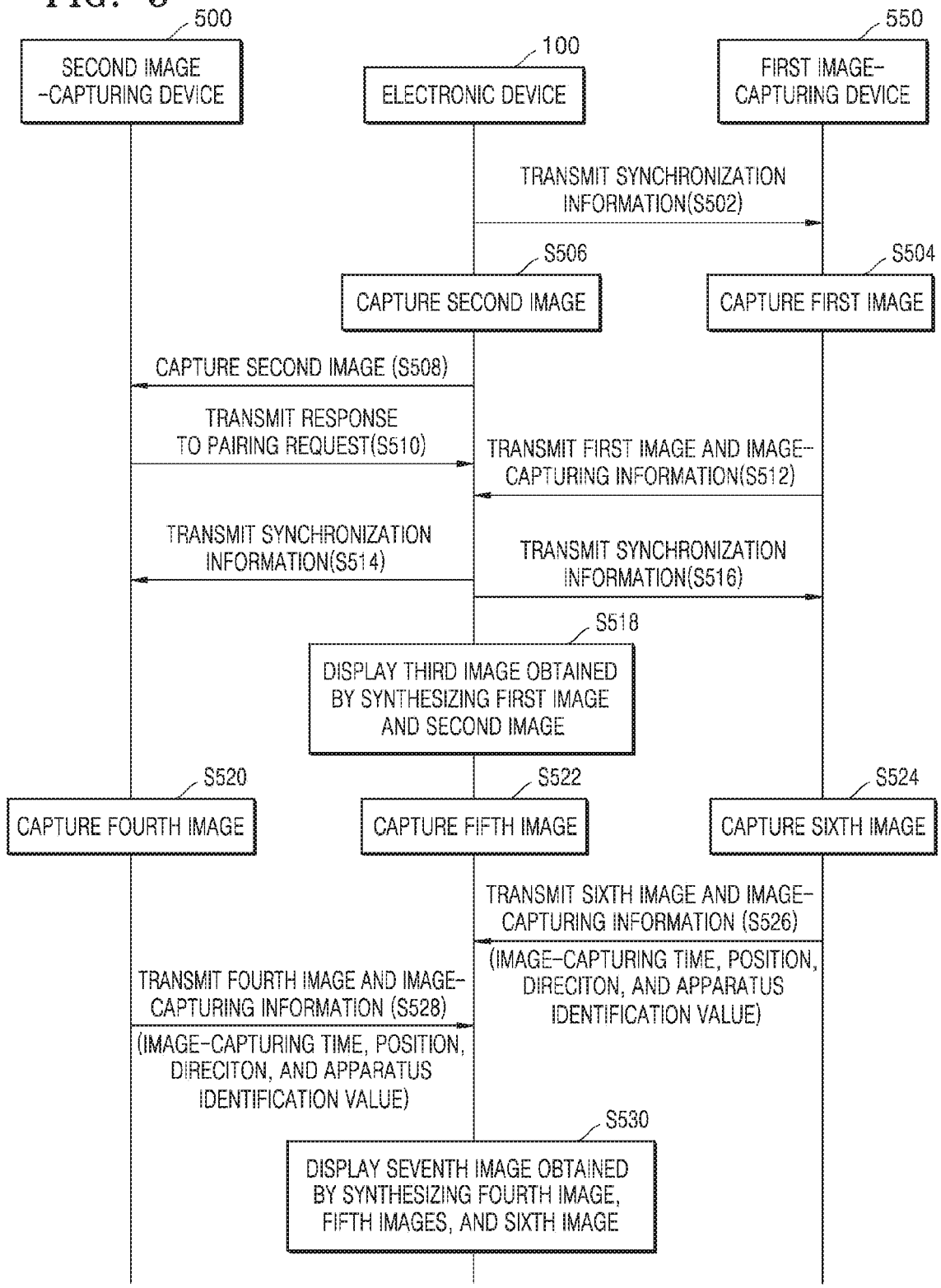
FIG. 5 is a view for describing a method, performed by the electronic device, of displaying an image obtained by receiving and synthesizing images captured by a plurality of image-capturing devices, according to an embodiment.

FIG. 5 is a view for describing a method, performed by an electronic device, of displaying an image obtained by receiving and synthesizing images captured by a plurality of image-capturing devices, according to an embodiment of the disclosure.

According to an embodiment of the disclosure, when a first image-capturing device 550 existing in an area where communication is possible is searched for and found, the electronic device 100 may transmit a pairing request to the first image-capturing device 550 and may receive a response to the pairing request from the first image-capturing device 550.

Referring to FIG. 5, in operation S502, the electronic device 100 may transmit synchronization information to the first image-capturing device 550. In operation S504, the first image-capturing device 550 may capture a first image based on the synchronization information received from the electronic device 100. In operation S506, the electronic device 100 may capture a second image.

According to an embodiment of the disclosure, as a second image-capturing device 500 or the electronic device 100 moves after the electronic device 100 transmits the synchronization information to the first image-capturing device 550 in operation S502, the second image-capturing device 500 within an area where communication with the electronic device 100 is possible may be searched for and found. Also, the electronic device 100 may perform pairing with the second image-capturing device 500.

In operation S508, the electronic device 100 may transmit a pairing request to the second image-capturing device 500. In operation S510, the second image-capturing device 500 may transmit a response to the pairing request to the electronic device 100. In operation S512, the first image-capturing device 550 may transmit the first image and image-capturing information of the first image to the electronic device 100.

In operation S514, the electronic device 100 may transmit the synchronization information to the second image-capturing device 500. In operation S516, the electronic device 100 may transmit the synchronization information to the first image-capturing device 550. However, according to the synchronization information transmitted in operation S502, the electronic device 100 may omit operation S516.

In operation S518, the electronic device 100 may display a third image obtained by synthesizing the first image and the second image. For example, the electronic device 100 may determine the second image captured by the electronic device 100 as an image corresponding to the first image, based on the image-capturing information of the first image.

In operation S520, the second image-capturing device 500 may capture a fourth image. In operation S522, the electronic device 100 may capture a fifth image. In operation S524, the first image-capturing device 550 may capture a sixth image. In operation S526, the first image-capturing device 550 may transmit the sixth image and image-capturing information of the sixth image. In operation S528, the second image-capturing device 500 may transmit the fourth image and image-capturing information of the fourth image.

In operation S530, the electronic device 100 may display a seventh image obtained by synthesizing the fourth image, the fifth image, and the sixth image. For example, the electronic device 100 may determine the fifth image captured by the electronic device 100 and the fourth image captured by the second image-capturing device 500 as images corresponding to the sixth image, based on the image-capturing information of the sixth image.

As described above, the electronic device 100 may display various images by receiving a plurality of images from a plurality of image-capturing devices, e.g., the first and second image-capturing devices 550 and 500. Also, when a new image-capturing device existing within an area where communication is possible is searched for and found, the electronic device 100 may update an image sharing environment by transmitting the synchronization information to the new image-capturing device.

FIG. 6 is a diagram illustrating metadata according to an embodiment of the disclosure.

According to an embodiment of the disclosure, image-capturing information of an image captured by the image-capturing device 200 may be stored as metadata about the image. The term 'metadata' may refer to information related to a target image of the metadata and information assigned to an image according to a predetermined rule. For example, the electronic device 100 and the image-capturing device 200 may generate the metadata including information corresponding to a field determined according to a predetermined rule. Also, the electronic device 100 may extract information related to the image from the metadata tagged to the image and may process the image by using the extracted information.

Referring to FIG. 6, metadata 600 may include, but is not limited to, an image-capturing device identification value 601, image-capturing position information 602, image-capturing direction information 603, relative position information 604, and image-capturing time information 605.

For example, the image-capturing device identification value 601 may be identification information assigned by the electronic device 100. The image-capturing device identification value 601 may be included in the metadata as a number or text.

For example, the image-capturing position information 602 may include information about coordinates and an altitude at which the image is captured. The image-capturing direction information 603 may include an angle value determined based on the magnetic North Pole. The relative position information 604 may include relative position information determined based on the electronic device 100. For example, the relative position information 604 may be determined based on the image-capturing position information 602 and the image-capturing direction information 603. The image-capturing time information 605 may be time information (msec) determined based on a reference time.

For example, referring to FIG. 6, first metadata 610 may be metadata about a first image captured by a first image-capturing device at a relative position of '0,0' (i.e., a criterion position) after 1.0 msec elapses from the reference time.

For example, referring to FIG. 6, second metadata 620 may be metadata about a second image captured by a second image-capturing device at a relative position '2,0' after 1.0 msec elapses from the reference time.

According to an embodiment of the disclosure, the electronic device 100 may receive the second metadata 620 along with the second image from the image-capturing device 200. The electronic device 100 may extract the image-capturing time information of the second image and the relative position information of the second image from the second metadata 620. Also, the electronic device 100 may extract the image-capturing time information of the first image and the relative position information on which the first image was captured from the first metadata 610. The electronic device 100 may determine the first image captured after '1.0 msec' elapses from the reference time as an image corresponding to the second image, based on the extracted information. Also, the electronic device 100 may display a synthesized image by locating the second image whose relative position information is '2.0' at the right of the first image, based on the extracted information. According to an embodiment of the disclosure, the electronic device 100 may simultaneously receive and synthesize an image by using metadata and may display the synthesized image.

Figure 7:
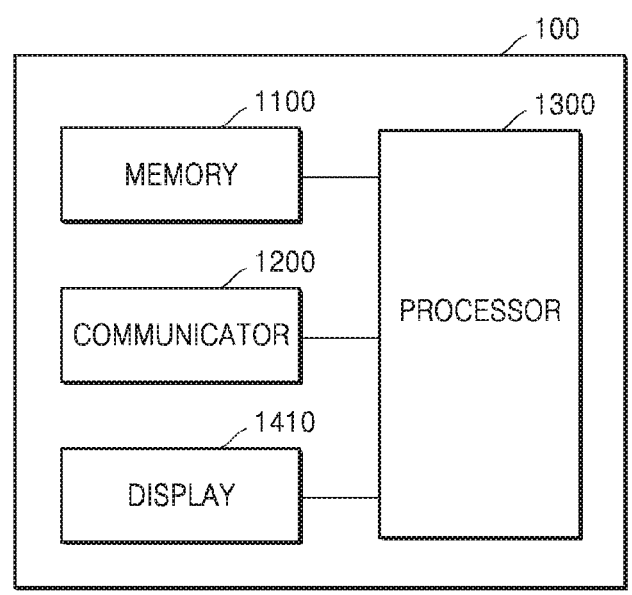
FIGS. 7 and 8 are block diagrams illustrating a configuration of the electronic device according to an embodiment.
Figure 8:
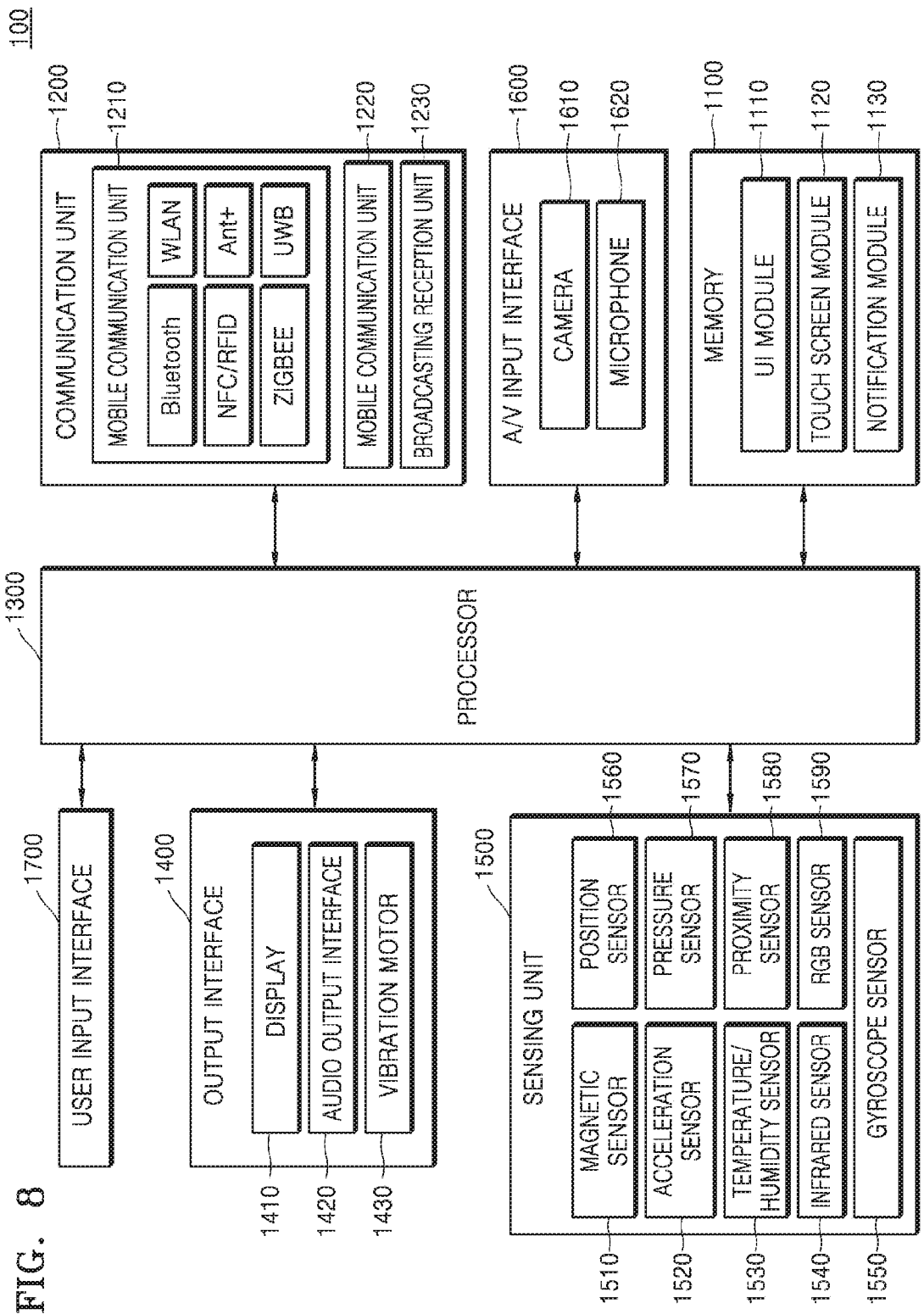

FIGS. 7 and 8 are block diagrams illustrating a configuration of an electronic device according to an embodiment of the disclosure.

As shown in FIG. 7, the electronic device 100 according to an embodiment of the disclosure may include a memory 1100, a communicator 1200, a display 1410, and a processor 1300.

However, all elements illustrated in FIG. 7 are not essential elements of the electronic device 100. The electronic device 100 may include elements more or fewer than those illustrated in FIG. 7.

For example, as shown in FIG. 8, the electronic device 100 according to an embodiment of the disclosure may further include an output interface 1400, a sensor 1500, an audio/video (A/V) input interface 1600, and a user input interface 1700 in addition to the memory 1100, the communicator 1200, the display 1410, and the processor 1300.

The memory 1100 may store a program for processing and controlling the processor 1300, and may store an image input to the electronic device 100. Also, the memory 1100 may store data needed for the processor 1300 to process an image.

For example, the memory 1100 may store an image received from the image-capturing device 200, and image-capturing time information, position information on which the image was captured, and direction information on which the image was captured. Also, the memory 1100 may store device information of the image-capturing device 200 received from the image-capturing device 200 and text information corresponding to the image-capturing device 200.

The memory 1100 may include at least one type of storage medium from among a flash memory type, a hard disk type, a multimedia card micro type, a card-type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Programs stored in the memory 1100 may be classified into a plurality of modules according to functions of the memory 1100. For example, the memory 1100 may include a user interface (UI) module 1110, a touchscreen module 1120, and a notification module 1130.

The UI module 1110 may provide a specialized UI or a graphical user interface (GUI) that interoperates with the electronic device 100 according to an application. The touchscreen module 11120 may detect a user's touch gesture on a touchscreen, and may transmit information about the touch gesture to the processor 1300. The touchscreen module 1120 according to an embodiment of the disclosure may recognize and analyze a touch code. The touchscreen module 1120 may be configured as separate hardware including a controller.

The notification module 1130 may generate a signal for notifying an event occurring in the electronic device 100. Examples of the event occurring in the electronic device 100 may include call signal reception, message reception, key signal input, and schedule notification. The notification module 1130 may output a notification signal as a video signal through the display 1410, may output a notification signal as an audio signal through a sound output interface 1420, or may output a notification signal as a vibration signal through a vibration motor 1430. For example, the notification module 1130 may generate a signal for outputting guide information based on estimated lane information.

The output interface 1400 may output an audio signal, a video signal, or a vibration signal, and may include the display 1410, the sound output interface 1420, and the vibration motor 1430.

The display 1410 displays and outputs information processed by the electronic device 100. In detail, the display 1410 may output an image captured by a camera 1610. Also, the display 1410 may output an image synthesized by the processor 1300.

Also, the display 1410 may output a user interface for executing a step related to a response to a user input.

The sound output interface 1420 outputs audio data received from the communicator 1200 or stored in the memory 1100. Also, the sound output interface 1420 outputs a sound signal (e.g., a call signal receiving sound, a message receiving sound, or a notification sound) related to a function performed by the electronic device 100.

The processor 1300 typically controls an overall operation of the electronic device 100. For example, the processor 1300 may control the user input interface 1700, the output interface 1400, the sensor 1500, the communicator 1200, and the A/V input interface 1600 by executing programs stored in the memory 1100. Also, the processor 1300 may perform a function of the electronic device 100 of FIGS. 1 through 6 by executing programs stored in the memory 1100.

In detail, the processor 1300 may control the communicator 1200 to transmit synchronization information for synchronization to the image-capturing device 200 connected to the electronic device 100 by executing one or more instructions stored in the memory 1100. The processor 1300 may control the communicator 1200 to transmit the synchronization information including a reference time and control information for controlling an image-capturing start time of the image-capturing device 200 generated based on the reference time. Also, the processor 1300 may control the communicator 1200 to receive a first image, image-capturing time information of the first image generated based on the synchronization information, and position information on which the first image was captured from the image-capturing device 200. For example, the first image may be an image captured by the image-capturing device 200.

According to an embodiment of the disclosure, the processor 1300 may generate the control information for controlling the image-capturing start time of the image-capturing device 200 based on the reference time. The first image may be an image captured by the image-capturing device 200 according to the control information generated by the processor 1300.

According to an embodiment of the disclosure, the processor 1300 may perform pairing to be connected to the image-capturing device 200. For example, the processor 1300 may control the communicator 1200 to perform pairing with the image-capturing device 200. For example, the processor 1300 may control a short-range communicator 1210 to search for the image-capturing device 200 within an area where short-range wireless communication with the electronic device 100 is possible and to be connected to the image-capturing device 200. Also, the processor 1300 may control the communicator 1200 to receive a response to a pairing request including device information of the image-capturing device 200.

According to an embodiment of the disclosure, the processor 1300 may determine whether to transmit the synchronization information based on the device information of the image-capturing device 200. For example, when a position of the image-capturing device 200 is not within a preset range, the processor 1300 may not transmit the synchronization information. Alternatively, when a difference between a resolution of an image captured by the image-capturing device 200 and a resolution of an image captured by the camera 1610 exceeds a preset range, the processor 1300 may not transmit the synchronization information.

Also, the processor 1300 may obtain one or more images. The processor 1300 may obtain the one or more images by receiving at least one image from another image-capturing device connected to the electronic device 100 through the communicator 1200. Alternatively, the processor 1300 may obtain the one or more images by controlling the camera 1610 to capture an image by executing one or more instructions stored in the memory 1100.

For example, when the electronic device 100 includes a plurality of the cameras 1610, the processor 1300 may obtain the one or more images by controlling the plurality of cameras 1610 to sequentially or simultaneously capture images.

Also, the processor 1300 may determine a second image corresponding to the first image from among the one or more images, based on the image-capturing time information of the first image and the position information on which the first image was captured. For example, the processor 1300 may determine the second image by comparing image-capturing time information of the obtained images and position information of the images with the image-capturing time information of the first image and the position information on which the first image was captured.

Alternatively, the processor 1300 may determine an image captured within a predetermined range from the position information on which the first image was captured from among the one or more images as the second image corresponding to the first image. For example, the processor 1300 may determine an image captured within a range where short-range wireless communication with the electronic device 100 or the image-capturing device 200 is possible as the second image.

Also, the processor 1300 may control the display 1410 to display a third image obtained by synthesizing the first image and the second image. For example, the processor 1300 may determine portions of the third image where the first image and the second image are displayed. Also, the processor 1300 may control the display 1410 to display the third image in which the first image and the second image are located in the determined portions.

According to an embodiment of the disclosure, the processor 1300 may control the communicator 1200 to receive the position information on which the first image was captured and direction information on which the first image was captured from the image-capturing device 200. Also, the processor 1300 may determine a portion of the third image corresponding to the first image, based on the position information on which the first image was captured and the direction information on which the first image was captured. Also, the processor 1300 may synthesize the first image with the second image based on the determined portion.

Also, when the first image and the second image which are adjacent to each other in the third image partially overlap each other, the processor 1300 may synthesize the first image with the second image to have an overlapping portion.

According to an embodiment of the disclosure, the processor 1300 may control the display 1410 to also display text information corresponding to the image-capturing device 200 in a portion of the third image where the first image is displayed. For example, the processor 1300 may control the communicator 1200 to receive the text information corresponding to the image-capturing device 200 from the image-capturing device 200.

According to an embodiment of the disclosure, the third image may be a 3D image. For example, the processor 1300 may synthesize the first image and the second image into a 3D image, based on the position information on which the first image was captured and the direction information on which the first image was captured.

According to an embodiment of the disclosure, the image-capturing time information of the first image and the position information of the first image captured by the image-capturing device 200 may be stored as metadata about the first image. Also, the processor 1300 may extract information related to the first image from the metadata tagged to the first image and may process the first image by using the extracted information.

The communicator 1200 may include one or more elements through which the electronic device 100 communicates with the image-capturing device 200. The image-capturing device 200 may be, but is not limited to, a computing device, like the electronic device 100, or a sensing device. For example, the communicator 1200 may include the short-range communicator 1210, a mobile communicator 1220, and a broadcast receiver 1230.

Examples of the short-range communicator 1210 may include, but are not limited to, a Bluetooth communicator, a BLE communicator, a near-field communicator, a WLAN (Wi-Fi) communicator, a Zigbee communicator, an IrDA communicator, a WFD communicator, a UWB communicator, and an Ant+ communicator. For example, the short-range communicator 1210 may transmit a pairing request to the image-capturing device 200 and may receive a response to the pairing request. Also, the short-range communicator 1210 may transmit synchronization information to the image-capturing device 200, and may receive an image and data related to the image from the image-capturing device 200.

The mobile communicator 1220 transmits/receives a wireless signal to/from at least one of a base station, an external terminal, and a server via a mobile communication network. Examples of the wireless signal may include a voice call signal, a video call signal, and any of various pieces of data according to text/multimedia message transmission/reception.

The broadcast receiver 1230 receives a broadcast signal and/or broadcast-related information from the outside through a broadcast channel. Examples of the broadcast channel may include a satellite channel and a terrestrial channel. According to an embodiment of the disclosure, the electronic device 100 may not include the broadcast receiver 1230.

According to an embodiment of the disclosure, the communicator 1200 may transmit synchronization information to the image-capturing device 200. For example, the communicator 1200 may transmit the synchronization information according to whether the processor 1300 transmits the synchronization information. Also, the communicator 1200 may transmit a pairing request to the image-capturing device 200 and may receive a response to the pairing request from the image-capturing device 200. For example, the communicator 1200 may receive the response to the pairing request including device information of the image-capturing device 200 from the image-capturing device 200.

Also, the communicator 1200 may receive a first image, image-capturing time information of the first image, position information on which the first image was captured, and direction information on which the first image was captured from the image-capturing device 200. Also, the communicator 120 may receive the device information of the image-capturing device 200 and text information corresponding to the image-capturing device 200 from the image-capturing device 200.

According to an embodiment of the disclosure, the communicator 1200 may receive at least one image from another image-capturing device connected to the electronic device 100.

The sensor 1500 may detect a state of the electronic device 100 or a state around the electronic device 100, and may transmit information about the state to the processor 1300.

The sensor 1500 may include at least one of, but not limited to, a terrestrial magnetism sensor 1510, an acceleration sensor 1520, a temperature/humidity sensor 1530, an infrared sensor 1540, a gyroscope sensor 1550, a position sensor (e.g., a GPS) 1560, a barometric pressure sensor 1570, a proximity sensor 1580, and an RGB sensor 1590. Functions of the sensors would have been intuitively derived by one of ordinary skill in the art from their names, and thus a detailed explanation thereof will not be given.

According to an embodiment of the disclosure, the sensor 1500 may measure a distance between at least one object and a vehicle determined in a captured image.

The A/V input interface 1600 for receiving an audio signal input or a video signal input may include the camera 1610 and a microphone 1620. The camera 1610 may obtain image frames such as a still image or a moving image by using an image sensor in a video call mode or an image-capturing mode. An image captured by the image sensor may be processed by the processor 1300 or an additional image processor (not shown).

The microphone 1620 receives an external sound signal and processes the external sound signal into electrical voice data. For example, the microphone 1620 may receive a sound signal from an external device or the user. The microphone 1620 may receive the user's voice input. The microphone 1620 may use any of various noise removing algorithms to remove noise occurring when receiving the external sound signal.

The user input interface 1700 is a unit through which the user inputs data for controlling the electronic device 100. Examples of the user input interface 1700 may include, but are not limited to, a keypad, a dome switch, a touchpad (e.g., a contact-type capacitance method, a pressure-type resistance film method, an infrared sensing method, a surface ultrasound transmission method, an integral tension measuring method, or a piezoelectric effect method), a jog wheel, and a jog switch.

An embodiment of the disclosure may be implemented as a recording medium including computer-readable instructions such as a computer-executable program module. The computer-readable medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically includes computer-readable instructions, a data structure, a program module, other data of a modulated data signal, or another transmission mechanism, and an example thereof includes an arbitrary information transmission medium.

Also, the term "unit" used herein may be a hardware component such as a processor a circuit and/or a software component executed in a hardware component such as a processor.

While the disclosure has been particularly shown and described with reference to embodiments thereof, it will be understood by one of ordinary skill in the art that various changes in form and details may be made therein without departing from the spirit and scope of the disclosure as defined by the following claims. Hence, it will be understood that the embodiments described above are not limiting of the scope of the disclosure. For example, each component described in a single type may be executed in a distributed manner, and components described distributed may also be executed in an integrated form.

The scope of the disclosure is indicated by the claims rather than by the detailed description of the disclosure, and it should be understood that the claims and all modifications or modified forms drawn from the concept of the claims are included in the scope of the disclosure.

The invention claimed is:

1. An electronic device comprising:
   a display;
   a communicator;
   a memory storing one or more instructions; and
   a processor configured to execute the one or more instructions stored in the memory to:
   transmit, through the communicator to an image-capturing device connected to the electronic device, synchronization information for synchronization,
   receive, through the communicator from the image-capturing device, a first image, image-capturing time information of a time when the first image was captured, the image-capturing time information being generated based on the synchronization information, position information of a position of the image-capturing device at the time at which the first image was captured, and direction information related to a direction of the image-capturing device at the time at which the first image was captured,
   obtain one or more images,
   compare image-capturing time information, position information, and direction information of the one or more images to the image-capturing time information, the position information, and the direction information of the first image,
   determine that a second image corresponds to the received first image from among the obtained one or more images, based on the comparing, and
   display a third image obtained by synthesizing the received first image and the corresponding second image.

2. The electronic device of claim 1, wherein the processor is further configured to, by executing the one or more instructions, determine a portion of the third image corresponding to the first image based on the position information and the direction information and synthesize the first image and the second image based on the determined portion.

3. The electronic device of claim 1, wherein the synchronization information comprises a reference time and control information for controlling an image-capturing start time of the image-capturing device generated based on the reference time, and wherein the first image is captured by the image-capturing device according to the control information.

4. The electronic device of claim 1, wherein the processor is further configured to transmit, through the communicator, a pairing request to the image-capturing device and receive a response to the pairing request from the image-capturing device, and wherein the received response comprises device information of the image-capturing device.

5. The electronic device of claim 4, wherein the processor is further configured to, by executing the one or more instructions;
   determine whether to transmit the synchronization information based on the device information of the image-capturing device, and
   transmit, through the communicator, the synchronization information to the image-capturing device according to the determination.

6. The electronic device of claim 1, further comprising a camera configured to capture the one or more images.

7. The electronic device of claim 1, wherein the image-capturing time information and the position information are stored as metadata about the first image.

8. The electronic device of claim 1, wherein the processor is further configured to, by executing the one or more instructions, display text information corresponding to the image-capturing device in a portion of the third image where the first image is included.

9. A method comprising:
    transmitting, to an image-capturing device connected to an electronic device, synchronization information for synchronization;
    receiving a first image, image-capturing time information of a time when the first image was captured, the image-capturing time information being generated based the synchronization information, position information of a position of the image-capturing device at the time at which the first image was captured, and direction information related to a direction of the image-capturing device at the time at which the first image was captured, from the image-capturing device;
    obtaining one or more images;
    comparing image-capturing time information, position information, and direction information of the one or more images to the image-capturing time information, the position information, and the direction information of the first image;
    determining that a second image corresponds to the received first image from among the obtained one or more images, based on comparing; and
    displaying a third image obtained by synthesizing the received first image and the corresponding second image.

10. The method of claim 9,
    wherein the obtaining of the third image comprises:
        determining a portion of the third image corresponding to the first image based on the position information and the direction information, and
        synthesizing the first image with the second image based on the determined portion.

11. The method of claim 9,
    wherein the synchronization information comprises a reference time and control information for controlling an image-capturing start time of the image-capturing device generated based on the reference time, and
    wherein the first image is captured by the image-capturing device according to the control information.

12. The method of claim 9, further comprising:
    transmitting a pairing request to the image-capturing device; and
    receiving a response to the pairing request from the image-capturing device,
    wherein the received response comprises device information of the image-capturing device.

13. The method of claim 12, wherein the transmitting of the synchronization information comprises:
    determining whether to transmit the synchronization information, based on the device information of the image-capturing device; and
    transmitting the synchronization information to the image-capturing device according to the determination.

14. The method of claim 9, wherein the obtaining of the one or more images comprises capturing the one or more images.

15. The method of claim 9, wherein the image-capturing time information and the position information are stored as metadata about the first image.

16. The method of claim 9, further comprising displaying text information corresponding to the image-capturing device in a portion of the third image where the first image is included.

17. A computer-readable recording medium having embodied thereon a program for executing the method of claim 9.

* * * * *